US011531770B2

(12) United States Patent
Pappachan et al.

(10) Patent No.: US 11,531,770 B2
(45) Date of Patent: Dec. 20, 2022

(54) TRUSTED LOCAL MEMORY MANAGEMENT IN A VIRTUALIZED GPU

(71) Applicant: Intel Corporation, Santa Clara, CA (US)

(72) Inventors: Pradeep M. Pappachan, Tualatin, OR (US); Luis S. Kida, Beaverton, OR (US); Reshma Lal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 16/725,267

(22) Filed: Dec. 23, 2019

(65) Prior Publication Data

US 2020/0134208 A1    Apr. 30, 2020

(51) Int. Cl.
   *G06F 21/60*    (2013.01)
   *G06F 12/1009*  (2016.01)
   (Continued)

(52) U.S. Cl.
   CPC ........ *G06F 21/602* (2013.01); *G06F 12/1009* (2013.01); *G06F 12/1458* (2013.01);
   (Continued)

(58) Field of Classification Search
   CPC .............. G06F 21/602; G06F 12/1009; G06F 12/1458; G06F 21/78; G06F 2212/1052; G06F 2221/2149; G06T 1/20; H04L 9/14
   See application file for complete search history.

(56) References Cited

U.S. PATENT DOCUMENTS

2015/0052309 A1*  2/2015  Philip ................... G06F 12/082
                                                 711/128
2015/0378930 A1* 12/2015  Sahita ................. G06F 9/45558
                                                 711/207

(Continued)

FOREIGN PATENT DOCUMENTS

CN     113094764 A    7/2021
DE   102020125599 A1  6/2021

OTHER PUBLICATIONS

Volos, et al., "Graviton: Trusted Execution Environments on GPUs", USENIX Association, 13th USENIX Symposium on Operating Systems Design and Implementation (OSDI '18), Oct. 8-10, 2018, Carlsbad, CA, USA, ISBN 978-1-939133-08-3, pp. 681-696.

*Primary Examiner* — Ayoub Alata
(74) *Attorney, Agent, or Firm* — Jaffery Watson Mendonsa & Hamilton LLP

(57) ABSTRACT

Embodiments are directed to trusted local memory management in a virtualized GPU. An embodiment of an apparatus includes one or more processors including a trusted execution environment (TEE); a GPU including a trusted agent; and a memory, the memory including GPU local memory, the trusted agent to ensure proper allocation/deallocation of the local memory and verify translations between graphics physical addresses (PAs) and PAs for the apparatus, wherein the local memory is partitioned into protection regions including a protected region and an unprotected region, and wherein the protected region to store a memory permission table maintained by the trusted agent, the memory permission table to include any virtual function assigned to a trusted domain, a per process graphics translation table to translate between graphics virtual address (VA) to graphics guest PA (GPA), and a local memory translation table to translate between graphics GPAs and PAs for the local memory.

20 Claims, 8 Drawing Sheets

First Embodiment

(51) Int. Cl.
*G06F 12/14* (2006.01)
*G06F 21/78* (2013.01)
*G06T 1/20* (2006.01)
*H04L 9/14* (2006.01)

(52) U.S. Cl.
CPC ............... *G06F 21/78* (2013.01); *G06T 1/20* (2013.01); *H04L 9/14* (2013.01); *G06F 2212/1052* (2013.01); *G06F 2221/2149* (2013.01)

(56) References Cited

U.S. PATENT DOCUMENTS

| | | | |
|---|---|---|---|
| 2016/0099810 A1* | 4/2016 | Li | G11C 15/00 713/193 |
| 2017/0249260 A1* | 8/2017 | Sahita | G06F 9/45533 |
| 2017/0249261 A1* | 8/2017 | Durham | G06F 12/145 |
| 2018/0004675 A1* | 1/2018 | Shanbhogue | G06F 3/0631 |
| 2018/0121125 A1* | 5/2018 | Zeng | G06F 3/0659 |
| 2018/0247082 A1* | 8/2018 | Durham | G06F 8/63 |

* cited by examiner

Protection of Workloads Downloaded to GPU Local Memory

GPU Trusted Agent (GTA):
- Ensure Proper Allocation/Deallocation of GPU Local Memory
- Verify Address Translation From GPA to PA
(First and Second Embodiments)
110

Multiple Key Encryption Engine
(Multi-Key Total Memory Encryption Engine (MKTME)):
- Memory Encryption Utilizing Multiple Keys
(First Embodiment)
120

GPU Memory Partitioning:
- Partitioning into Protection Regions – Hidden, Protected, Unprotected
(First and Second Embodiments)
130

GPU Memory Permission Table (GMPT):
- Maintained by GTA
- Device PA, Device GPA, VF Owner, Attributes
(First and Second Embodiments)
140

Trusted Programming of GPU Page Tables:
- Programming of PPGTT Performed by VF KMD
- PF KMD Requests GTA to Perform Allocation of Physical Pages or Map Device PA Into VF LMEM BAR
(First and Second Embodiments)
150

*FIG. 1*

TRUSTED LOCAL MEMORY MANAGEMENT IN A VIRTUALIZED GPU

TECHNICAL FIELD

Embodiments described herein generally relate to the field of electronic devices and, more particularly, trusted local memory management in a virtualized GPU.

BACKGROUND

Certain processing operations require high performance processing, and central processing units (CPUs) often cannot provide the processing power that is needed, and may utilize the compute processing power of a graphics processing unit (GPU), i.e., perform general purpose GPU (GPGPU) operations. Operations may include virtualized GPU operations in which multiple secure containers for GPU compute kernel execution may be implemented.

Certain secure processing requires the user of a trusted execution environment (TEE), such as trusted domains (TDs) in Trusted Domain Extensions (TDX) technology, where TDX is a TEE for virtual machines running in virtualized environments. For secure acceleration of workloads that are offloaded from host TEEs to the virtualized GPU, it is essential to protect compute kernels and data that is within the local memory of the GPU.

However, GPU local memory is conventionally managed by the host kernel mode driver (KMD), which is outside the trusted computing base (TCB) of the host TEE. For this, workloads in GPU local memory may be vulnerable to multiple different attacks, including physical attacks, privileged software attacks, and attacks from other kernels running inside the GPU.

BRIEF DESCRIPTION OF THE DRAWINGS

Embodiments described here are illustrated by way of example, and not by way of limitation, in the figures of the accompanying drawings in which like reference numerals refer to similar elements.

FIG. 1 illustrates components of an apparatus, system, or process to protect workloads in GPU local memory, according to some embodiments;

DETAILED DESCRIPTION

Figure 2:
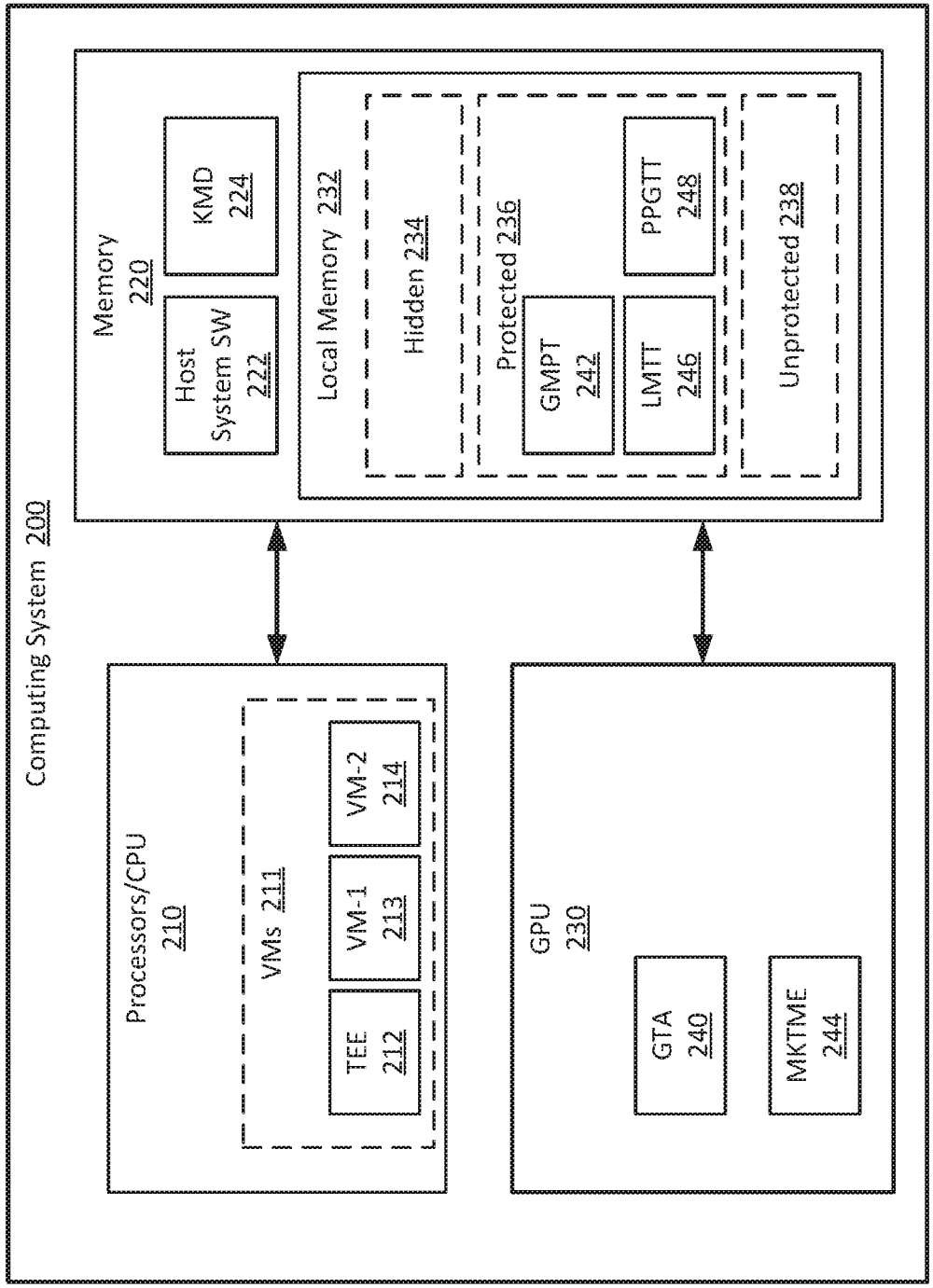
FIG. 2 is an illustration of a system to provide protection of workloads in GPU local memory utilizing encryption and access control according to some embodiments.

Embodiments described herein are directed to trusted local memory management in a virtualized GPU.

In some embodiments, an apparatus, system, or method is to provide memory management to protect a virtualized GPU workload in GPU local memory from physical attacks, privileged software attacks, and attacks from other kernels running inside the GPU.

In conventional virtualized GPU operation, GPU local memory is managed by the host kernel mode driver (KMD) outside of the trusted computing base (TCB) of the host trusted execution environment (TEE). As a result, workloads in GPU local memory may be at risk of physical attacks, privileged software attacks (wherein the host KMD can read or write to local memory assigned to workloads, incorrectly map physical addresses (PAs) into virtual address (VA) space, or other such actions), and attacks from other kernels running inside the GPU.

In some embodiments, an apparatus, system, or process is to utilize GPU memory resources in a trusted manner, while preserving the role of the KMD as the manager of those resources. Memory resources are protected against software attacks, both from the host and other workloads running concurrently in the GPU. In some embodiments, the apparatus, system, or process is further to protect GPU local memory against physical attacks.

In some embodiments, an apparatus, system, or process provides either of the following:

(1) First Embodiment: Implements memory encryption and access control for trusted local memory management in a virtualized GPU.

(2) Second Embodiment: Implements access control to prevent privileged software attacks for trusted local memory management in a virtualized GPU.

It is noted that the Second Embodiment may be implemented in circumstances in which, for example, memory encryption technology used in the First Embodiment is not viable, such as because of performance or other implications. The Second Embodiment implements security by preventing privileged software attacks. In a particular example in which the GPU local memory is located inside the package (as in High Bandwidth Memory (HBM)), performing physical attacks may be more difficult in comparison with physical attacks on external memory, and thus the physical memory structure together with the Second Embodiment may provide sufficient security protection.

FIG. 1 illustrates components of an apparatus, system, or process to protect workloads in GPU local memory, according to some embodiments. In some embodiments, key components of a technology to safeguard data downloaded from a TEE to local memory include the following:

GPU Trusted Agent 110:

A GPU trusted agent (GTA) may include, but is not limited to, a trusted security controller that can attest to its firmware measurement. The GTA may be viewed as an analog of the host's trusted agent for TDX (SEAM). In some embodiments, the GTA is to ensure proper allocation/deallocation of GPU local memory to various virtual functions (VFs—referring to virtual functions within a GPU device) assigned to trusted domains (TDs) and verify that the translation from device guest physical address (GPA) to device physical address (PA) is correct. Note that this address translation comes from the untrusted physical function (PF) KMD, and thus the address translation is checked to prevent mapping of a physical page from one context into another context's address space, or mapping two (or more) virtual pages to the same physical page, within the same context.

Multiple Key Encryption Engine (MKTME) 120:

In some embodiments, an encryption engine supporting multiple keys, such as Multi-Key Total Memory Encryption Engine (MKTME), is implemented to enable to the separation of workloads for security purposes. The technology supports confidentiality and integrity (such as MKTME used for TDX). The encryption engine is utilized for the First Embodiment, wherein the selection of encryption keys for the encryption engine may be provided as described for the First Embodiment illustrated in FIG. 2.

GPU Memory Partitioning 130:

In some embodiments, GPU local memory is partitioned into three protection regions with respect to host system software, including at least a protected region that is inaccessible to host system software. In some embodiments, the protection regions are:

(1) Hidden Region:

The Hidden Region is not visible from the CPU. (e.g., write-only phase change memory (WOPCM)).

(2) Protected Region:

The Protected Region is protected from host software system attacks, the Protected Region being inaccessible to host system software. The enforcement mechanism for the Protected Region is dependent on the particular embodiment, wherein encryption is used for enforcement in the First Embodiment and access control is used for enforcement in the Second Embodiment. The Protected Region is used to protect first and second-level translation tables (PPGTT (Per process Graphics Translation Table)—used to translate device guest physical address to device physical address), LMTT (Local Memory Translation Table)—used to translate device guest physical address to device physical address) and VF memory allocated for TD use.

(3) Unprotected Region:

The Unprotected Region is accessible from PF KMD and non-TD host software (e.g., regular virtual functions (VFs)). The Unprotected Region is generally not protected from host system software attacks.

GPU Memory Permission Table (GMPT) 140:

The GMPT may be viewed as the analog of the physical address metadata table (PAMT) on the host side for TDX (Trusted Domain Extensions). The table is maintained by the GTA. Each physical page in local memory that is allocated to a VF assigned to a TD has an entry in the GMPT. Each entry in the GMPT records a VF # (virtual function number), a device GPA that maps to the VF, and attributes such as access permissions (RWX (Read Write Execution)). The entry is created when a physical page is allocated to a VF (assigned to a TD) and invalidated when the physical page is deallocated.

An example of the GMPT is shown below in Table 1.

TABLE 1

Example of GMPT

| Device PA | Device GPA | VF Owner | Attributes |
|---|---|---|---|
| DPA1 | DGPA1 | VF1 | RX |
| DPA2 | DGPA2 | VF2 | RW |
| DPA3 | DGPA3 | VF3 | RW |

Trusted Programming of GPU Page Tables 150:

For memory accesses to graphics local memory from the host, the process is performed as follows: A guest VM (Virtual Machine) or TD's virtual address is translated to guest physical address by the first level host page tables, and then to host physical address targeting graphics memory. This host physical address is in the VF LMEM (Local Memory) BAR (Base Address Registers) region. When this host physical address reaches the GPU, the Gunit translates the host physical address to the device physical address using the LMTT. For memory accesses to graphics local memory from within the GPU, there are two levels of address translation. The first level of address translation, performed using the PPGTT, translates graphics virtual address to graphics guest physical address. The PPGTT tables for this first translation are set up by the VM or TD; in the case of the TD, these PPGTT tables reside in protected memory and are not accessible to untrusted host software. The second level of address translation is from graphics guest physical address to device physical address and is performed using the LMTT, which is verified and set up jointly by the KMD and the GTA. The LMTT also resides in protected memory.

In some embodiments, programming of the PPGTT (Per-Process Graphics Translation Tables) is performed by the VF KMD, which is trusted in the TDX model. When the PF KMD (Physical Function KMD) needs to allocate physical pages from GPU local memory to a VF that is assigned to a TD or to map the device PA into VF LMEM BAR as indicated in the LMTT, the PF KMD requests the GTA to perform the action. (LMEM BAR is a PCI Express BAR that exposes the GPU local memory to the host CPU, and VF LMEM BAR is a PCI Express BAR that exposes a part of GPU local memory to a VF on the host CPU.) The GTA then uses the GMPT to ensure that the page has not been allocated elsewhere and the mapping is performed correctly (i.e., there is no remapping across different contexts or many-to-one mapping inside of a context). The PF KMD can make memory allocation and address translation requests of the GTA through special commands written to MMIO (Memory-Mapped I/O) registers in PF GTTMMADR (Graphics Translation Table Modification Range and Memory Mapped Range) BAR.

Figure 4:
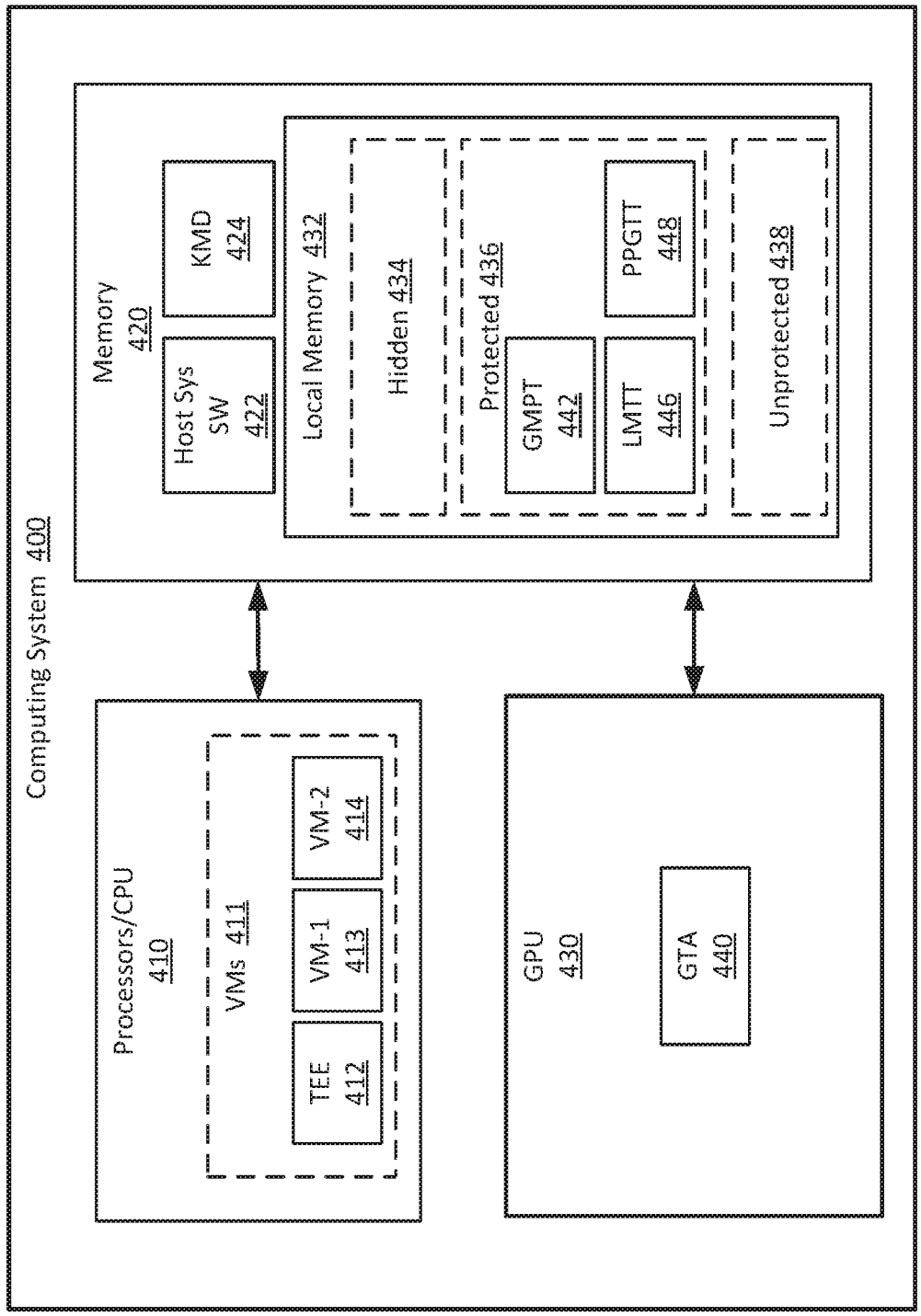
FIG. 4 is an illustration of a system to provide protection of workloads in GPU local memory utilizing access control according to some embodiments.

In some embodiments, an apparatus, system, or process is to provide security for workloads in a virtualized GPU environment utilizing the technology illustrated in FIG. 1, wherein the apparatus, system, or process is structured as provided in FIG. 2 for a First Embodiment utilizing memory encryption and access control, or as provided in FIG. 4 for an second embodiment utilizing access control.

FIG. 2 is an illustration of a system to provide protection of workloads in GPU local memory utilizing encryption and access control according to some embodiments. In a First Embodiment, a computing system 200 utilizes both encryption and access control to provide security for workloads while present in GPU local memory.

As illustrated in FIG. 2, the computing system 200 may include one or more processors such as a central processing unit (CPU) 210, the one or more processors 210 including virtual machines (VMs) 211, such as a TEE 212 and one or more other VMs, illustrated as VM-1 213 and VM-2 214. The computing system 200 further includes a graphics processing unit (GPU) 230 and a computer memory 220 for storage of data, which may include random access memory (RAM) and other memory. The computer memory 220 may store data including host system software 222, a kernel mode driver (KMD) 224, GPU memory permission table (GMPT) 242, per process graphics translation table (PPGTT) 248, and local memory translation table (LMTT) 246. The memory 220 includes local memory 232 for the GPU 230. The local memory 232 is partitioned into a plurality of protection regions, wherein the protection regions may include a hidden region 234, a protected region 236, and an unprotected region 238. In some embodiments, the GMPT 242, PPGTT 248, and LMTT 246 are stored in the protected region 236.

In some embodiments, the GPU 230 include a GPU trusted agent (GTA) 240 to ensure proper allocation/deallocation of GPU local memory to various virtual functions assigned to trusted domains and verify that the translation from device guest physical address (GPA) to device physical address (PA) is correct. The GTA 240 is to maintain the GMPT 242 to record data regarding each physical page in local memory that is allocated to a virtual function assigned to a TEE. Further, the computing system 200 provides for trusted programming of GPU page tables.

In some embodiments, the GPU 230 further includes an encryption engine supporting multiple keys for encryption 244, such as MKTME. The protected region 236 is partitioned into multiple protection domains, with each protection domain being encrypted by a unique symmetric key, and with each key being associated with a key ID. The encryption engine 244 is to maintain a table that maps each key ID to the respective key. In some embodiments, each translated device PA that goes to the local memory controller is accompanied by a key ID.

In some embodiments, the Key ID space is partitioned into 2 contiguous ranges: one for TD-owned memory resources and the other for all other memory resources. For example, if the Key ID range is 0-63, the subrange 32-63 may be reserved for TD VFs, and the subrange 0-31 may be reserved for PF and other regular (non-TD) VFs.

In some embodiments, the GPU is to select the correct key ID for each local memory access request. The information required for correct key ID selection is stored in a table that is accessible by the device memory management unit (MMU). The format of the Key ID Selector Table (KST) may be as follows in Table 2:

TABLE 2

| Key ID Selector Table (KST) | | |
| --- | --- | --- |
| Memory Owner | Address Range (PF/VF LMEM BAR range) | Key ID |
| PF | A01-A02 | KID_00 |
| VF1 | A11-A12 | KID_01 |
| VF2 | A21-A22 | KID_02 |
| VF3 | A31-A32 | KID_32 |
| VF4 | A41-A42 | KID_33 |

In Table 2, the first column identifies the owner (physical function or virtual function) of the portion of local memory. The second column defines the local memory range (in LMEM BAR (PCI BAR corresponding to GPU local memory)) allocated to the PF or VF. The third column is the Key ID assigned to the local memory for the PF or VF. In a particular example, VF1 and VF2 are regular, non-TD VFs and VF3 and VF4 are assigned to TDs. The Key ID assignments thus follow the range restrictions in Key ID range example above, i.e., PF, VF1 and VF2 (not assigned to TDs) have Key IDs in the subrange 0-31. VF3 and VF4, which are assigned to TDs, have Key IDs in the subrange 32-63. Uses of the Key ID Selector Table during memory access are described in relation to FIGS. 3A and 3B for the First Embodiment.

Figure 3A:
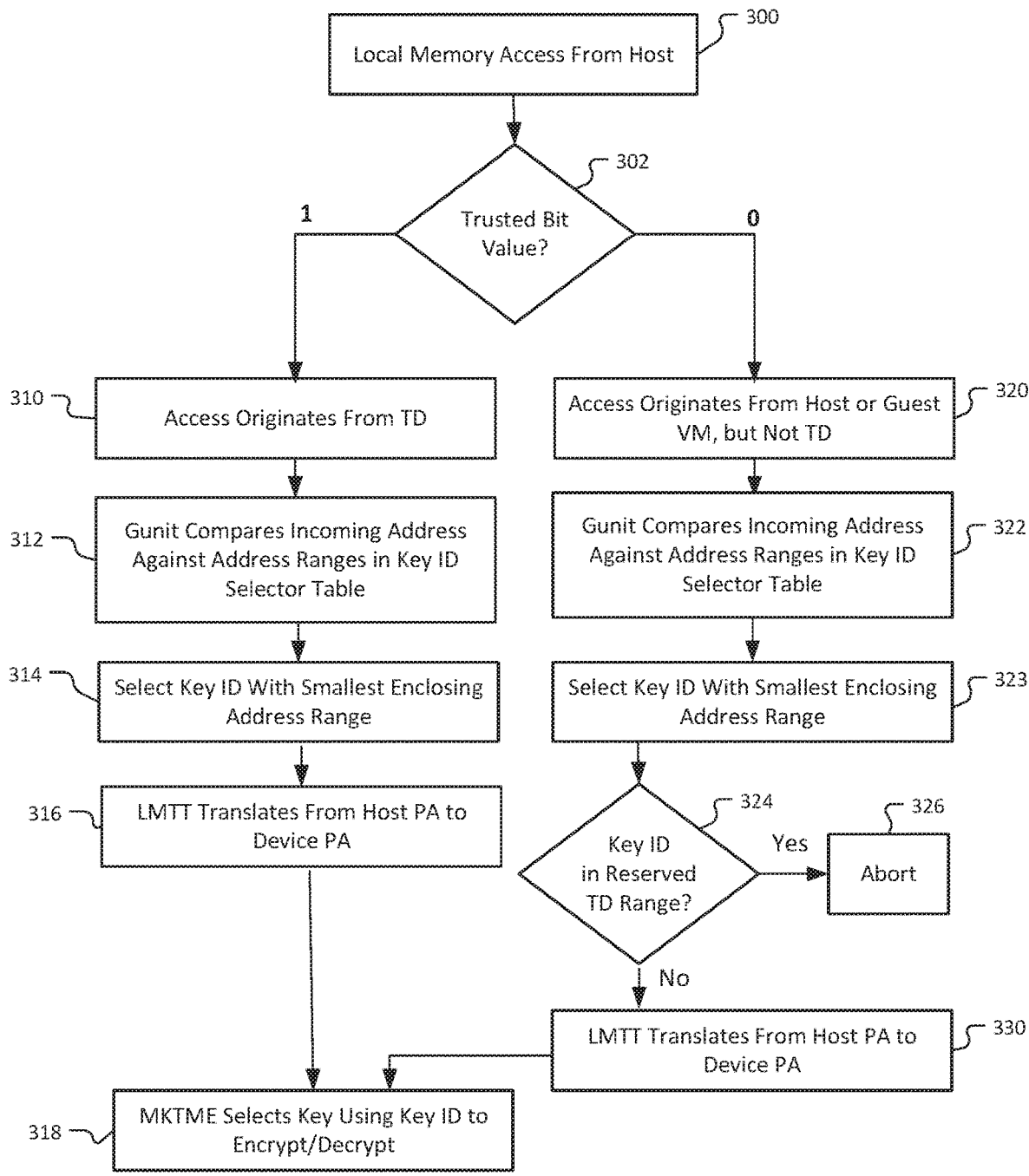
FIG. 3A is an illustration of a process for access from a host to GPU local memory utilizing encryption and access control according to some embodiments.

FIG. 3A is an illustration of a process for access from a host to GPU local memory utilizing encryption and access control according to some embodiments. For a First Embodiment, such as utilizing the system 200 illustrated in FIG. 2, for an local memory access request from a host 300, there is a determination regarding a trusted bit value (or other similar value) to determine the host KMD, TD, or VM that originated the access request 302. The trusted bit, which is only set by the host on accesses originating from a TD, is a bit in the header of the PCI Express TLP (Translation Layer Packet) packet.

Upon determining that the access request originates from a trusted domain 310 (e.g., a Trusted Bit Value='1'), the Gunit (referring to a component of a GPU that interfaces with the host over PCI Express) compares the incoming address against address ranges in a key ID selector table 312, and selects a key ID with a smallest enclosing range 314. The LMTT is to translate the host PA (host physical address) to a device PA 316, and the encryption engine (MKTME) selects a key using the key ID received to encrypt or decrypt the respective data 318.

Upon determining that the access request originates from guest or host VM but not a trusted domain 320 (e.g., Trusted Bit Value='0'), the Gunit compares the incoming address against address ranges in a key ID selector table 322 and a key ID with a smallest enclosing range is selected 323. If the determined key ID is in the reserved TD Key ID range 324, then the operation is aborted to prevent improper access 326. The LMTT translates the host PA address to a device PA 330, and the encryption engine (MKTME) selects a key using the key ID received to encrypt or decrypt the respective data 318.

Figure 3B:
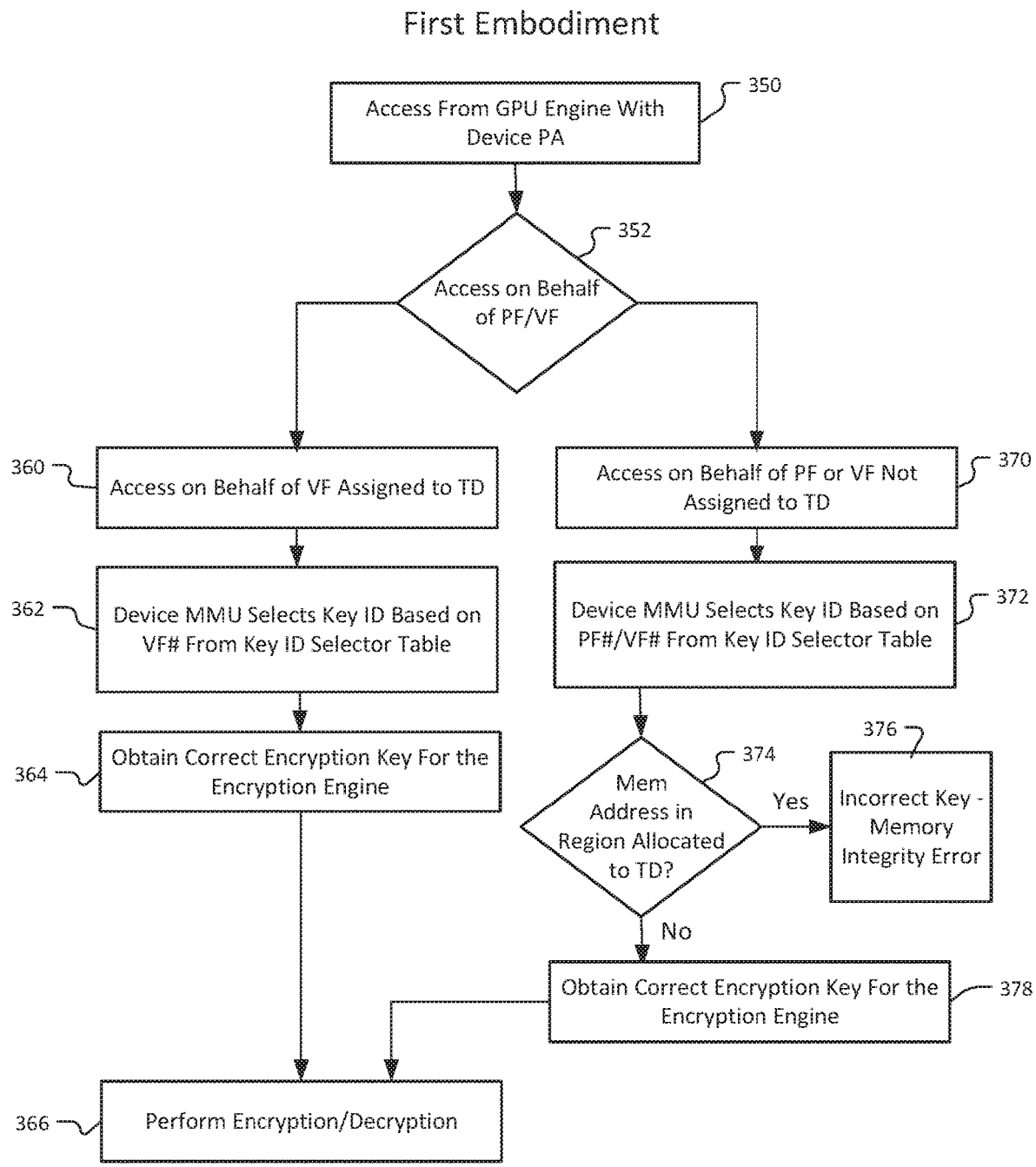
FIG. 3B is an illustration of a process for access from a GPU engine to GPU local memory utilizing encryption and access control according to some embodiments.

FIG. 3B is an illustration of a process for access from a GPU engine to GPU local memory utilizing encryption and access control according to some embodiments. For a First Embodiment, such as utilizing the system 200 illustrated in FIG. 2, for an local memory access request from a GPU engine with a device PA 350, there is a determination regarding whether the PF or VF that originated the access is assigned to a TD 352.

Upon determining that the access request originates from a VF assigned to a trusted domain 360, the device MMU selects a key ID based on the respective VF # from the key ID selector table 362. The device then obtains the correct encryption key for the encryption engine 364, and performs the encryption or decryption utilizing the key 366.

Upon determining that the access request originates from a PF or a VF that is not assigned to a TD 370, the device MMU selects a key ID based on the respective PF #/VF # from the key ID selector table 372. If the memory address is in a region allocated to a TD 374, then an incorrect key for encryption/decryption will be selected 376, leading to failure in decryption or computation of an integrity tag during encryption that will fail subsequent decryptions (memory integrity error). Otherwise, the device MMU will obtain the correct encryption key for the encryption engine 378, and will perform the encryption or decryption utilizing the key 366.

FIG. 4 is an illustration of a system to provide protection of workloads in GPU local memory utilizing access control according to some embodiments. In a second embodiment, a computing system 400 utilizes access control to provide security for workloads while present in GPU local memory.

As illustrated in FIG. 4, the computing system 400 may include one or more processors such as a central processing unit (CPU) 410, the one or more processors 410 including virtual machines (VMs) 411, such as a TEE 412 and one or more other VMs, illustrated as VM-1 413 and VM-2 414. The computing system 400 further includes a graphics processing unit (GPU) 430 and a computer memory 420 for storage of data, which may include random access memory (RAM) and other memory. The computer memory 420 may store data, including host system software (HSS) 422, a kernel mode driver (KMD) 424, GPU memory permission table (GMPT) 442, per process graphics translation table (PPGTT) 448, and local memory translation table (LMTT) 446. The memory 420 includes local memory 432 for the GPU 430. The local memory 432 is partitioned into a plurality of protection regions, wherein the protection regions may include a hidden region 434, a protected region 436, and an unprotected region 438. In some embodiments, the GMPT 442, PPGTT 448, and LMTT 446 are stored in the protected region 436.

In some embodiments, the GPU 430 include a GTA 440 to ensure proper allocation/deallocation of GPU local memory 432 and verify the translation from device GPA to device PA is correct. Further, the computing system 400 provides for trusted programming of GPU page tables.

In the Second Embodiment there is no memory encryption engine to protect GPU local memory against physical attacks. In some embodiments, the computing system 400 provides runtime checks to ensure that local memory allocated to VFs that are assigned to TDs are not accessed by untrusted host system software.

In some embodiments, the GTA 440, partitioning of local memory 432, the GMPT 442, and the trusted programming of GPU page tables (as further described in elements 110, 130, 140, and 150 of FIG. 1) operate in a same manner as in the First Embodiment.

In some embodiments, the LMTT 446, the PPGTT 448, and GMPT 444 are stored in a region of local memory that is not accessible to the host (enforced by Gunit), i.e., the protected region of memory. The LMTT 446 and GMPT 444 are managed by GTA, and are not protected by encryption.

Figure 5A:
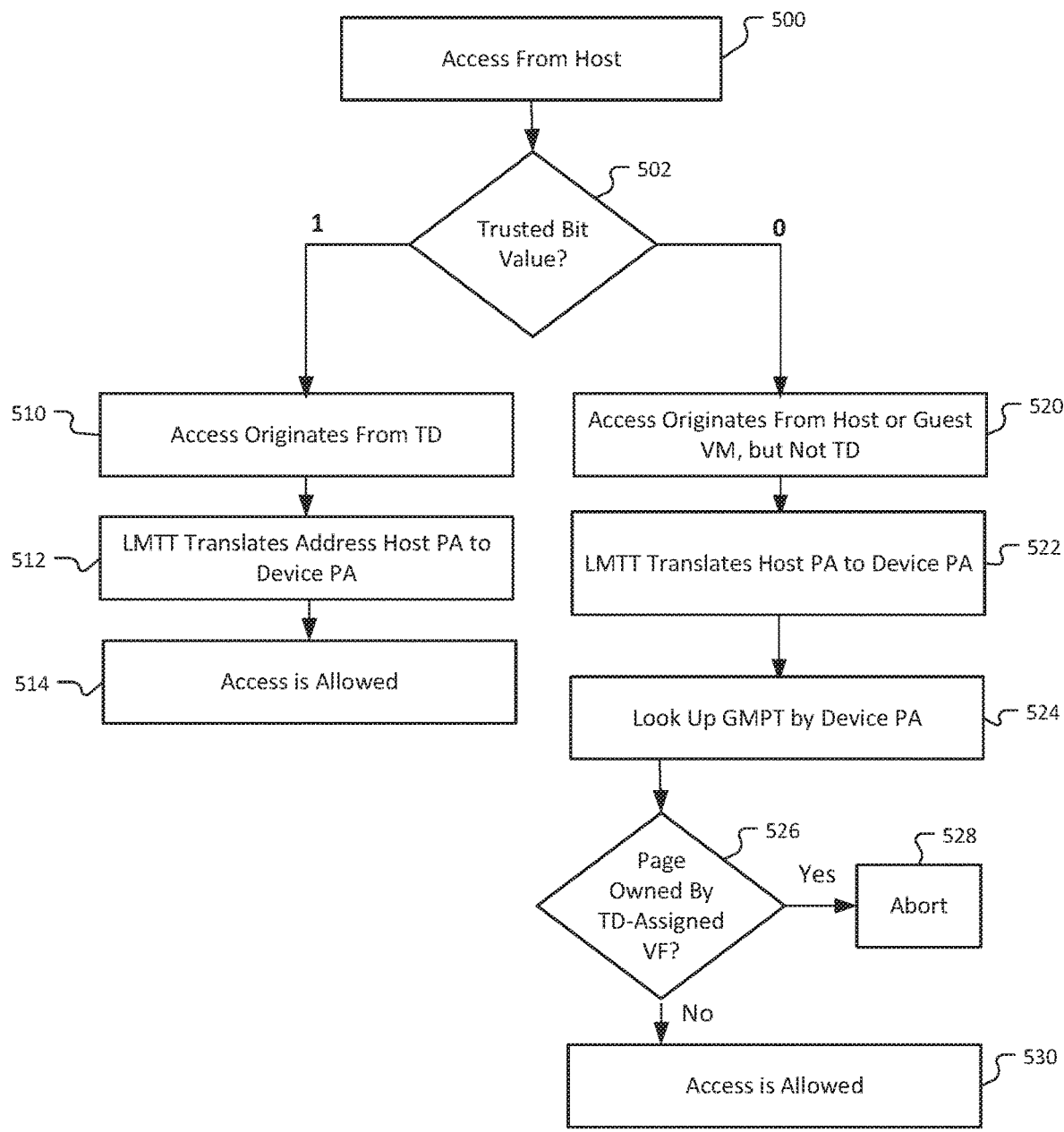
FIG. 5A is an illustration of a process for access from a host to GPU local memory utilizing access control according to some embodiments.

FIG. 5A is an illustration of a process for access from a host to GPU local memory utilizing access control according to some embodiments. For a Second Embodiment, such as utilizing the system 400 illustrated in FIG. 4, for an local memory access request from a host 500, there is a determination regarding a trusted bit value (or other similar value) to determine the VM or TD that originated the access request 502.

Upon determining that the access request originates from a trusted domain 510 (e.g., a Trusted Bit Value='1'), the LMTT is to translate the host PA address to a device PA 512, and access to the relevant data is allowed 514.

Upon determining that the access request originates from guest VM or host but not a trusted domain 520 (e.g., Trusted Bit Value='0'), the LMTT translates the host PA address from to a device PA 522. The address is then looked up by the GTA in the GMPT 524, such as is illustrated in Table 1, to determine whether the page is owned by a TD-assigned VF 526. If so, then the process is aborted 528. If not, the access can then be allowed 530.

Figure 5B:
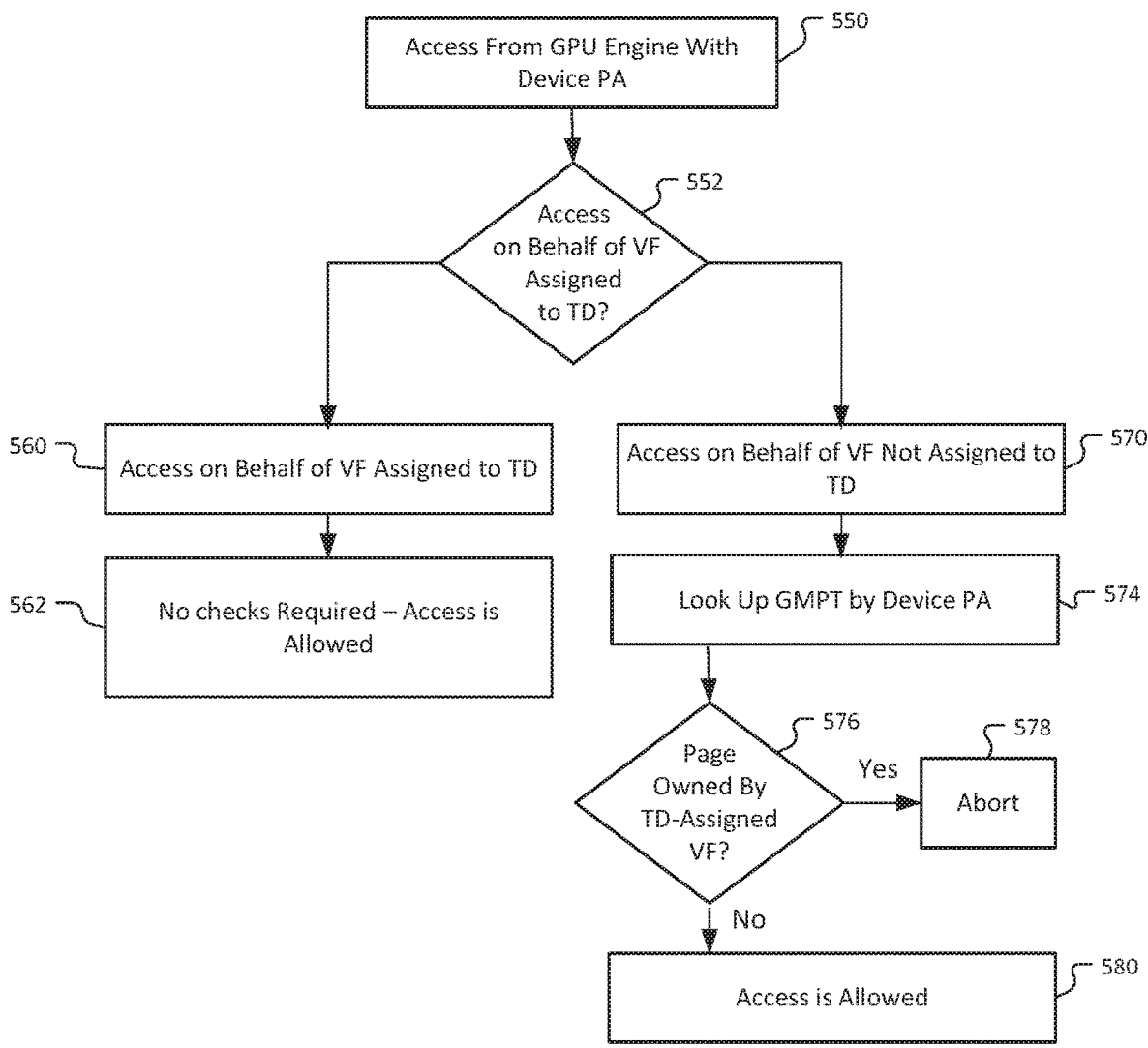
FIG. 5B is an illustration of a process for access from a GPU engine to GPU local memory utilizing access control according to some embodiments.

FIG. 5B is an illustration of a process for access from a GPU engine to GPU local memory utilizing encryption and access control according to some embodiments. For a Second Embodiment, such as utilizing the system 400 illustrated in FIG. 4, for an local memory access request from a GPU engine 550, there is a determination regarding whether the VF that originated the access request is assigned to a TD 552.

Upon determining that the access request originates from a VF assigned to a trusted domain 560, there are no checks required, and access to the respective data is allowed 562.

Otherwise, the access request originates from a VF that is not assigned to a TD 570. The relevant page entry is then looked up by the GTA in the GMPT by device PA 574, such as is illustrated in Table 1, to determine whether the page is owned by a TD-assigned VF 576. If so, then the process is aborted 578. If not, the access can then be allowed 580.

Figure 6:
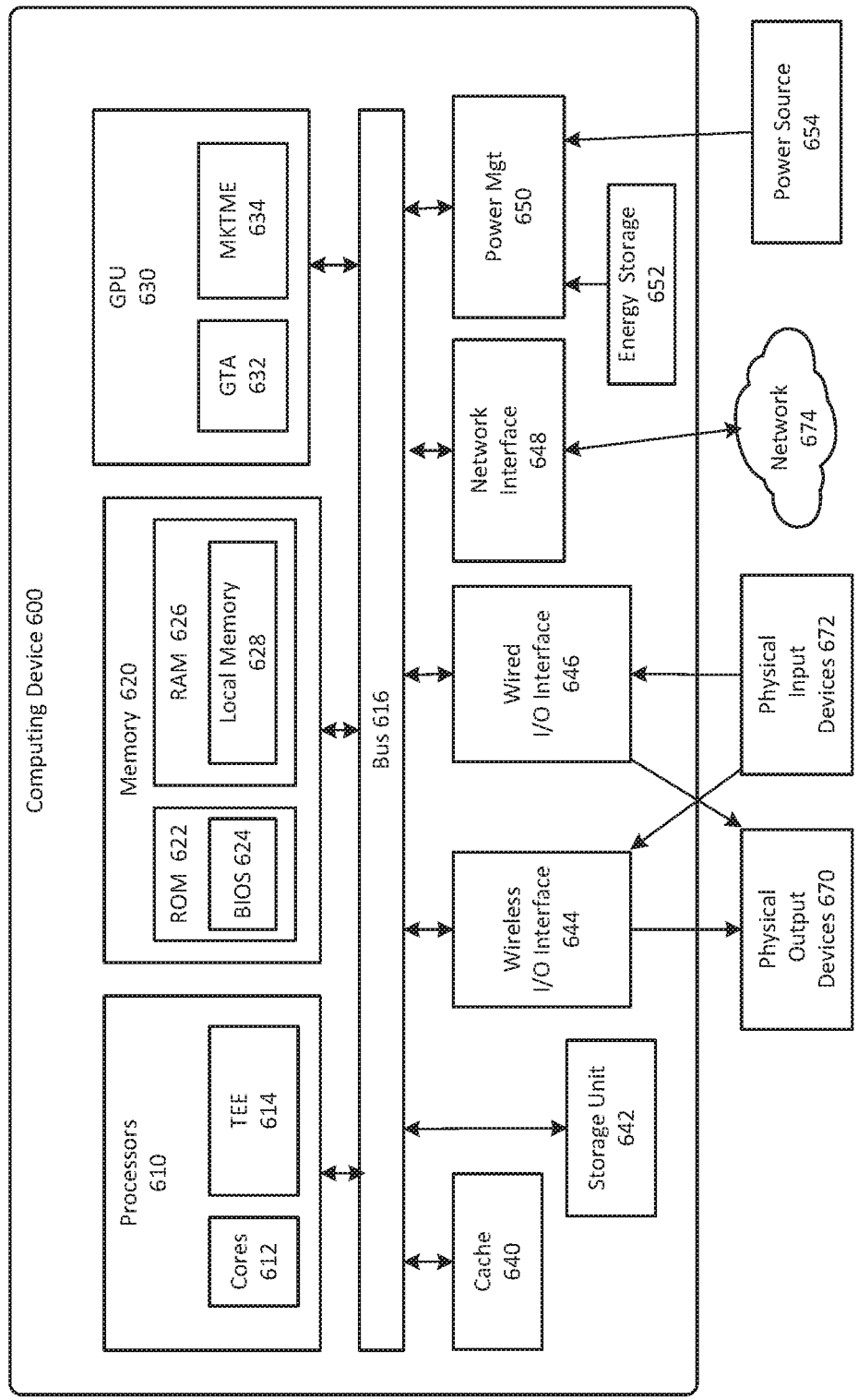
FIG. 6 is a schematic diagram of a computing device to provide trusted local memory management in a virtualized GPU according to some embodiments.

FIG. 6 is a schematic diagram of a computing device to provide trusted local memory management in a virtualized GPU according to some embodiments. The computing device 600 may perform operations as illustrated in one or more of FIGS. 1-5B. In some embodiments, the computing device 600 includes one or more processors including one or more processors cores and a TEE 614 to enable maintenance of security of data, as TEE 212 in FIG. 2 or TEE 412 in FIG. 4.

The computing device further includes memory 620, which may include read only memory (ROM) 622 and random access memory (RAM) 626, wherein the RAM may include local memory 628. In some embodiments, the computing device 600 further includes a GPU 630, wherein the GPU includes a GPU trusted agent (GTA) 632 to ensure proper allocation and deallocation of GPU local memory and a multiple key encryption engine (MKTME) 634 to support data confidentiality and integrity.

The computing device 600 may additionally include one or more of the following: cache 640, a non-transitory storage unit 642, a wireless input/output (I/O) interface 644, a wired I/O interface 646, power management circuitry 650, and a network interface 648 for connection to a network 674. The following discussion provides a brief, general description of the components forming the illustrative computing device 600. Example, non-limiting computing devices 600 may include a desktop computing device, blade server device, workstation, or similar device or system.

In embodiments, the processor cores 612 are capable of executing machine-readable instruction sets, reading data and/or instruction sets from one or more storage devices 642 and writing data to the one or more storage devices 642. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 612 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 612, the cache 640, the graphics processor circuitry 630, one or more wireless I/O interfaces 644, one or more wired I/O interfaces 646, one or more storage devices 642, and/or one or more network interfaces 648. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 612 may include any number, type, or combination of currently available or future developed devices capable of executing machine-readable instruction sets. The processor cores 612 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

A portion of the ROM 622 may be used to store or otherwise retain a basic input/output system ("BIOS") 624. The BIOS 624 provides basic functionality to the computing device 600, for example by causing the processor cores 612 to load and/or execute one or more machine-readable instruction sets. In embodiments, at least some of the one or more machine-readable instruction sets cause at least a portion of the processor cores 612 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 644. The at least one wireless I/O interface 644 may be communicably coupled to one or more physical output devices 670 (tactile devices, video displays, audio output devices, hardcopy output devices, etc.). The at least one wireless I/O interface 644 may communicably couple to one or more physical input devices 672 (pointing devices, touchscreens, keyboards, tactile devices, etc.). The at least one wireless I/O interface 644 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 646. The at least one wired I/O interface 646 may be communicably coupled to one or more physical output devices 670 (tactile devices, video displays, audio output devices, hardcopy output devices, etc.). The at least one wired I/O interface 646 may be communicably coupled to one or more physical input devices 672 (pointing devices, touchscreens, keyboards, tactile devices, etc.). The wired I/O interface 646 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 642. The data storage devices 642 may include one or more hard disk drives (HDDs) and/or one or more solid-state storage devices (SSDs). The one or more data storage devices 642 may include any current or future developed storage appliances, network storage devices, and/or systems. Non-limiting examples of such data storage devices 642 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 642 may include one or more removable storage devices, such as one or more flash drives, flash memories, flash storage units, or similar appliances or devices capable of communicable coupling to and decoupling from the computing device 600.

The one or more data storage devices 642 may include interfaces or controllers (not shown) communicatively coupling the respective storage device or system to the bus 616. The one or more data storage devices 642 may store, retain, or otherwise contain machine-readable instruction sets, data structures, program modules, data stores, databases, logical structures, and/or other data useful to the processor cores 612 and/or graphics processor circuitry 630 and/or one or more applications executed on or by the processor cores 612 and/or graphics processor circuitry 630. In some instances, one or more data storage devices 642 may be communicably coupled to the processor cores 612, for example via the bus 616 or via one or more wired communications interfaces 646 (e.g., Universal Serial Bus or USB); one or more wireless communications interfaces 644 (e.g., Bluetooth®, Near Field Communication or NFC); and/or one or more network interfaces 648 (IEEE 802.3 or Ethernet, IEEE 802.11, or Wi-Fi®, etc.).

Processor-readable instruction sets and other programs, applications, logic sets, and/or modules may be stored in whole or in part in the system memory 620. Such instruction sets may be transferred, in whole or in part, from the one or more data storage devices 642. The instruction sets may be loaded, stored, or otherwise retained in system memory 620, in whole or in part, during execution by the processor cores 612 and/or graphics processor circuitry 630.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 612, the graphics processor circuitry 630, the wireless I/O interface 644, the wired I/O interface 646, the storage device 642, and the network interface 648 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 612 and/or the graphics processor circuitry 630. In some embodiments, all or a portion of the bus 616 may be omitted and the components are coupled directly to each other using suitable wired or wireless connections.

In some embodiments, an apparatus includes one or more processors including a trusted execution environment (TEE); a graphics processing unit (GPU), the GPU including a trusted agent; and a memory to store data including host system software, the memory including local memory for the GPU, the trusted agent to ensure proper allocation and deallocation of the local memory and verify translations between graphics physical addresses (PAs) and PAs for the apparatus; wherein the local memory is partitioned into a plurality of protection regions, including a protected region that is not accessible to the host system software and an unprotected region that is accessible to the host system software; wherein the protected region is to store at least a memory permission table maintained by the trusted agent, the memory permission table to include any virtual function assigned to a trusted domain, a per process graphics translation table to translate between graphics virtual address (VA) and graphics guest PA (GPA), and a local memory translation table to translate between graphics GPAs and PAs for the local memory.

In some embodiments, the local memory is managed by a host kernel mode driver that is outside of a trusted computing base of the TEE.

In some embodiments, the apparatus performs encryption and access control for the local memory, the GPU further including an encryption engine supporting multiple encryption keys.

In some embodiments, a key ID space for the multiple encryption keys includes a first range reserved for virtual functions assigned to trusted domains and a second range reserved for other memory resources.

In some embodiments, the apparatus is to abort a access request for the local memory upon determining that the access request is from the host or VM (but not a Trusted Domain) and that a key ID for the VM or host software falls within the first range.

In some embodiments, the apparatus performs access control for the local memory, the one or more processors to perform runtime checks to ensure that local memory allocated to any virtual function that is assigned to a trusted domain is not accessed by untrusted host system software.

In some embodiments, the apparatus is to abort a access request for the local memory upon determining that the access request is from a virtual function that is not assigned to a trusted domain, and determining that an address for the access request is owned by a virtual function assigned to a trusted domain.

In some embodiments, the trusted agent is a trusted security controller.

In some embodiments, one or more non-transitory computer-readable storage mediums having stored thereon executable computer program instructions that, when executed by one or more processors, cause the one or more processors to perform operations including receiving an access request in a system including a trusted execution environment (TEE), the access request being directed to a local memory for a graphics processing unit (GPU) of the system, wherein the local memory is partitioned into a plurality of protection regions, including a protected region that is not accessible to host system software and an unprotected region that is accessible to the host system software, the protected region including a memory permission table maintained by a trusted agent of the GPU, the memory permission table to include any virtual function assigned to a trusted domain, a per process graphics translation table to translate between graphics virtual address (VA) to graphics guest physical address (GPA), and a local memory translation table to translate between graphics GPAs and physical addresses (PAs) for the local memory; determining whether the access request is from a virtual function assigned to a trusted domain; and upon determining the access request is not from a virtual function assigned to a trusted domain and that the access request is associated with a trusted domain, aborting the access request.

In some embodiments, the local memory is managed by a host kernel mode driver that is outside of a trusted computing base of the TEE.

In some embodiments, the instructions include instructions for performing encryption and access control for the local memory, the GPU further including an encryption engine supporting multiple encryption keys.

In some embodiments, a key ID space for the multiple encryption keys includes a first range reserved for virtual functions assigned to trusted domains and a second range reserved for other memory resources.

In some embodiments, the instructions include instructions for aborting a host memory access request upon determining that the access request is from a VM (and not a trusted domain), and that a key ID for the physical function or virtual function falls within the first range.

In some embodiments, the instructions include instructions for performing access control for the local memory, including performing runtime checks to ensure that local memory allocated to any virtual function that is assigned to a trusted domain is not accessed by untrusted host system software.

In some embodiments, the trusted agent is a trusted security controller.

In some embodiments, a method includes managing local memory of a system by a host kernel mode driver, the system including a trusted execution environment (TEE) and the host kernel mode driver being outside of a trusted computing base of the TEE; receiving an access request directed to a local memory for a graphics processing unit (GPU) of the system, wherein the local memory is partitioned into a plurality of protection regions, including a protected region that is not accessible to host system software and an unprotected region that is accessible to the host system software, the protected region including a memory permission table maintained by a trusted agent of the GPU, the memory permission table to include any virtual function assigned to a trusted domain, a per process graphics translation table to translate between graphics virtual address (VA) to graphics guest physical address (GPA), and a local memory translation table to translate between graphics GPAs and physical addresses (PAs) for the local memory; determining whether the access request is from a virtual function assigned to a trusted domain; and upon determining the access request is not from a virtual function assigned to a trusted domain and that the access request is associated with a trusted domain, aborting the access request.

In some embodiments, the method further includes performing encryption and access control for the local memory, the GPU further including an encryption engine supporting multiple encryption keys.

In some embodiments, a key ID space for the multiple encryption keys includes a first range reserved for virtual functions assigned to trusted domains and a second range reserved for other memory resources.

In some embodiments, the method further includes aborting a host memory access request upon determining that the access request is from a VM (and not a trusted domain), and that a key ID for the physical function or virtual function falls within the first range.

In some embodiments, the method further includes performing access control for the local memory, including performing runtime checks to ensure that local memory allocated to any virtual function that is assigned to a trusted domain is not accessed by untrusted host system software.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   one or more processors including a trusted execution environment (TEE);
   a graphics processing unit (GPU), the GPU including a trusted agent; and
   a memory to store data including host system software, the memory including local memory for the GPU, the trusted agent to ensure proper allocation and deallocation of the local memory and verify translations between graphics physical addresses (PAs) and PAs for the apparatus;
   wherein the local memory is partitioned into a plurality of protection regions, including a protected region that is not accessible to the host system software and an unprotected region that is accessible to the host system software; and wherein the protected region includes at least a memory permission table maintained by the trusted agent, the memory permission table to include any virtual function assigned to a trusted domain, a per process graphics translation table to translate between graphics virtual address (VA) and graphics guest PA (GPA), and a local memory translation table to translate between graphics GPAs and PAs for the local memory.

2. The apparatus of claim 1, wherein the local memory is managed by a host kernel mode driver that is outside of a trusted computing base of the TEE.

3. The apparatus of claim 1, wherein the apparatus is to perform encryption and access control for the local memory, the GPU further including an encryption engine supporting multiple encryption keys.

4. The apparatus of claim 3, wherein a key ID space for the multiple encryption keys includes a first range reserved for virtual functions assigned to trusted domains and a second range reserved for other memory resources.

5. The apparatus of claim 4, wherein the apparatus is to abort an access request for the local memory in response to determining that the access request is from host software or a virtual machine but is not from a trusted domain, and that a key ID for the virtual machine or host software falls within the first range.

6. The apparatus of claim 1, wherein the apparatus performs access control for the local memory, the one or more processors to perform runtime checks to ensure that local memory allocated to any virtual function that is assigned to a trusted domain is not accessed by untrusted host system software.

7. The apparatus of claim 6, wherein the apparatus is to abort an access request for the local memory in response to determining that the access request is from a virtual function that is not assigned to a trusted domain, and determining that an address for the access request is owned by a virtual function assigned to a trusted domain.

8. The apparatus of claim 1, wherein the trusted agent is a trusted security controller.

9. One or more non-transitory computer-readable storage mediums having stored thereon executable computer program instructions that, when executed by one or more processors, cause the one or more processors to perform operations comprising:
receiving an access request in a system including a trusted execution environment (TEE), the access request being directed to a local memory for a graphics processing unit (GPU) of the system, wherein the local memory is partitioned into a plurality of protection regions, including a protected region that is not accessible to host system software and an unprotected region that is accessible to the host system software, the protected region including:
a memory permission table maintained by a trusted agent of the GPU, the memory permission table to include any virtual function assigned to a trusted domain,
a per process graphics translation table to translate between graphics virtual address (VA) to graphics guest physical address (GPA), and
a local memory translation table to translate between graphics GPAs and physical addresses (PAs) for the local memory;
determining whether the access request is from a virtual function assigned to a trusted domain; and
in response to determining the access request is not from a virtual function assigned to a trusted domain and that the access request is associated with a trusted domain, aborting the access request.

10. The one or more mediums of claim 9, wherein the local memory is managed by a host kernel mode driver that is outside of a trusted computing base of the TEE.

11. The one or more mediums of claim 9, wherein the instructions further include instructions for:
performing encryption and access control for the local memory, the GPU further including an encryption engine supporting multiple encryption keys.

12. The one or more mediums of claim 11, wherein a key ID space for the multiple encryption keys includes a first range reserved for virtual functions assigned to trusted domains and a second range reserved for other memory resources.

13. The one or more mediums of claim 12, wherein the instructions further include instructions for:
aborting a host memory access request in response to determining that the access request is from a physical function or from a virtual function that is not assigned to a trusted domain, and that a key ID for the physical function or virtual function falls within the first range.

14. The one or more mediums of claim 9, wherein the instructions further include instructions for:
performing access control for the local memory, including performing runtime checks to ensure that local memory allocated to any virtual function that is assigned to a trusted domain is not accessed by untrusted host system software.

15. The one or more mediums of claim 9, wherein the trusted agent is a trusted security controller.

16. A method comprising:
managing local memory of a system by a host kernel mode driver, the system including a trusted execution environment (TEE) and the host kernel mode driver being outside of a trusted computing base of the TEE;
receiving an access request directed to a local memory for a graphics processing unit (GPU) of the system, wherein the local memory is partitioned into a plurality of protection regions, including a protected region that is not accessible to host system software and an unprotected region that is accessible to the host system software, the protected region including:
a memory permission table maintained by a trusted agent of the GPU, the memory permission table to include any virtual function assigned to a trusted domain,
a per process graphics translation table to translate between graphics virtual address (VA) to graphics guest physical address (GPA), and
a local memory translation table to translate between graphics GPAs and physical addresses (PAs) for the local memory;
determining whether the access request is from a virtual function assigned to a trusted domain; and
in response to determining the access request is not from a virtual function assigned to a trusted domain and that the access request is associated with a trusted domain, aborting the access request.

17. The method of claim 16, further comprising performing encryption and access control for the local memory, the GPU further including an encryption engine supporting multiple encryption keys.

18. The method of claim 17, wherein a key ID space for the multiple encryption keys includes a first range reserved for virtual functions assigned to trusted domains and a second range reserved for other memory resources.

19. The method of claim 18, further comprising:
aborting a host memory access request in response to determining that the access request is from a physical function or from a virtual function that is not assigned to a trusted domain, and that a key ID for the physical function or virtual function falls within the first range.

20. The method of claim 16, further comprising performing access control for the local memory, including performing runtime checks to ensure that local memory allocated to any virtual function that is assigned to a trusted domain is not accessed by untrusted host system software.

* * * * *